United States Patent [19]
Davis

[11] 3,992,581

[45] Nov. 16, 1976

[54] PHASE LOCKED LOOP NRZ DATA REPEATER

[75] Inventor: William W. Davis, Minneapolis, Minn.

[73] Assignee: Sperry Rand Corporation, New York, N.Y.

[22] Filed: Sept. 2, 1975

[21] Appl. No.: 609,323

[52] U.S. Cl. ........................... 178/70 R; 178/69 A; 178/69.5 R; 325/42
[51] Int. Cl.² ..................... H04L 25/20; H03D 3/18
[58] Field of Search ............ 325/42, 346; 178/70 R, 178/69 A, 69.5 R; 179/15 BS

[56] References Cited
UNITED STATES PATENTS

| | | | |
|---|---|---|---|
| 3,593,044 | 7/1971 | McNeilly et al. | 178/69.5 R |
| 3,878,334 | 4/1975 | Halpern | 325/42 |

*Primary Examiner*—Thomas A. Robinson
*Attorney, Agent, or Firm*—Thomas J. Nikolai; Kenneth T. Grace; Marshall M. Truex

[57] ABSTRACT

A phase locked loop repeater for reshaping a non-return to zero (NRZ) data stream. A transition detector receives the input data stream from a coaxial cable in a degraded condition in terms of amplitude and phase distortion and produces reference pulses whose positions are very nearly independent of the direction of the transition of the input data. These reference pulses, along with clock pulses from a voltage controlled oscillator (VCO), are applied to a phase comparator and when these signals differ in phase, a voltage is developed for modifying the frequency of the VCO. The clock signals from the VCO are applied to the clock input of a D-type (edge triggered) flip-flop, to which is also applied the incoming data stream. The D-type flip-flop changes state in accordance with the incoming data only at the leading or trailing edge of the clock pulses. As such, the timing and amplitude of the data stream is reconstructed for reapplication and further transmission on said coaxial cable.

5 Claims, 5 Drawing Figures

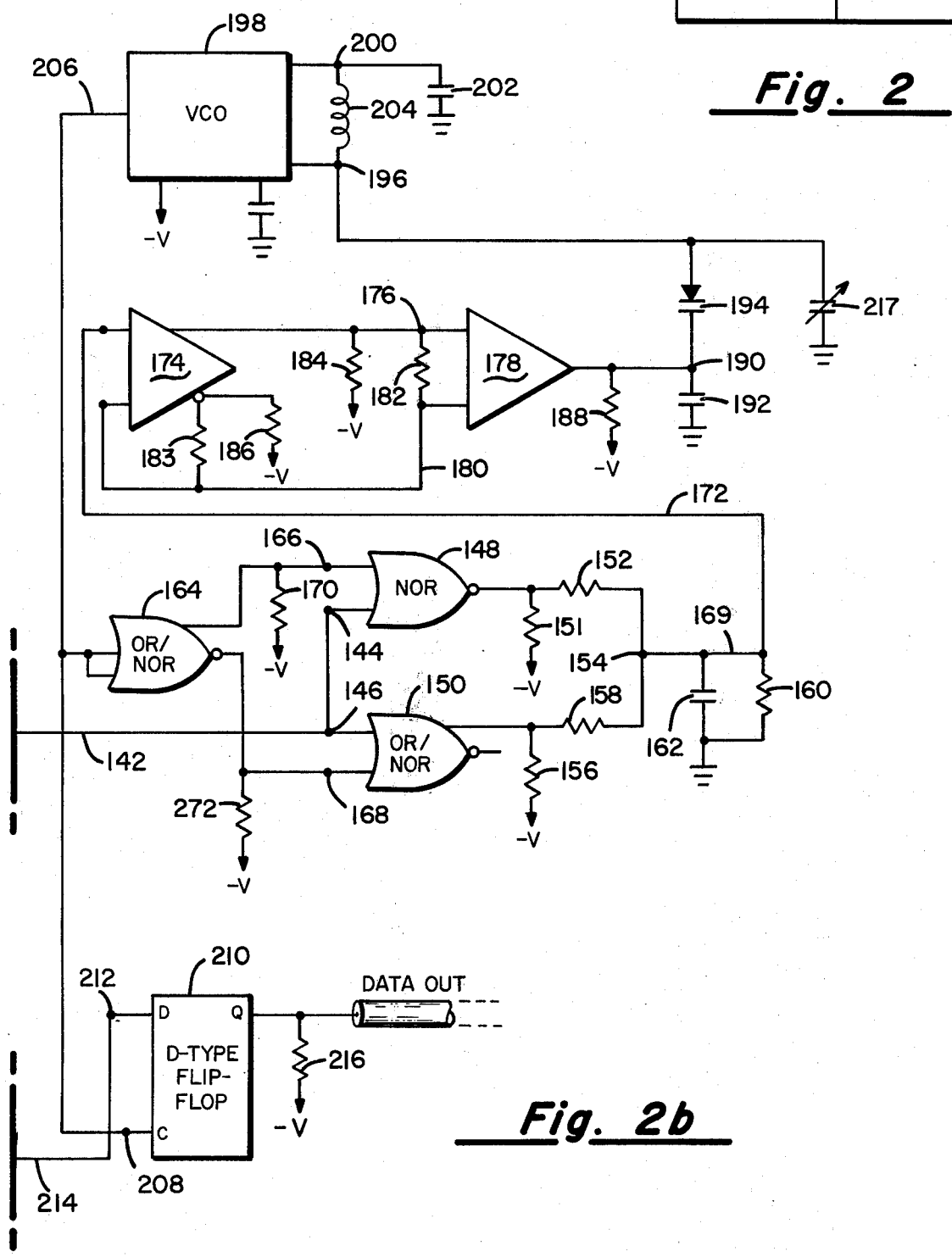

PHASE LOCKED LOOP NRZ DATA REPEATER

BACKGROUND OF THE INVENTION

This invention relates generally to pulse code modulation transmission systems and more specifically to a logic network which is adapted to be disposed in a signal transmission line for reshaping and retiming the data stream to obviate amplitude and phase distortion introduced by the transmission line.

Transmission of digital data over transmission lines results in degradation of the signal waveform, as a function of the characteristics and length of the transmission line. The degradation has two basic components, attenuation and phase distortion. Phase distortion may be defined as the time displacement between the actual signal level transition and the nominal transition, divided by the nominal data bit interval. Where cable lengths between a data transmitter and a receiver are short relative to the transmission rate employed, it may be sufficient to operate without compensation in the lines. However, where the cable lengths are long such that distortion becomes excessive, for proper reception, it is necessary to provide a repeater which will regenerate pulse durations or the transition time instants.

The present invention is concerned with the design of such a regenerative repeater network which may be used to regenerate non-return to zero (NRZ) data streams which is a common mode of encoding digital data for asynchronous (unclocked) transmission. Many known regenerative repeater networks will not operate when NRZ encoding is employed. This is due to the fact that NRZ encoded data does not include a spectral component at its fundamental clock frequency. The present invention includes a novel transition detector which operates to generate this fundamental clock frequency component.

In accordance with the teachings of this invention, the incoming data stream is applied to the "Data" terminal of a so-called "D-type" flip-flop, which, as is well known in the art, is a bistable circuit which produces at its output the signal levels existing at its "Data" terminal at the instant that a predetermined clock signal transition is applied to its "Clock" input terminal. The input data stream to be regenerated is also applied to a novel transition detector network designed to produce short reference pulses each time the incoming data stream undergoes either a positive or a negative transition from an arbitrary reference point. These reference pulses will hereinafter be referred to as "T" pulses, for convenience.

The T pulses are applied as a first input to a "phase-lock loop" network. The phase-lock loop includes a free-running voltage controlled oscillator (VCO) clock, an amplifier and a phase comparator network. More specifically, the T pulses are applied to one input of the phase comparator and the output from the VCO clock is connected to a second input. At phase lock, a clock transition divides a T pulse equally so that the phase comparator does not produce an error output signal. However, if the VCO deviates in phase, a voltage signal is developed at the output of the phase comparator which causes the VCO to alter its frequency in a direction to reduce the error signal to zero. The output from the VCO clock is applied to the "Clock" terminal of the D-type flip-flop and is used to trigger the flip-flop and thereby gate the data stream to the output cable.

In implementing the regerative repeater, conventional commercially available ECL integrated circuits are utilized throughout. As such, packaging of the repeater is facilitated.

OBJECTS

It is accordingly the principal object of the present invention to provide an improved regenerative repeater network for reshaping and retiming digital signal trains which have undergone distortion in their transmission.

Another object of this invention is to provide a regenerative repeater utilizing a transition detector and phase-lock loop for reshaping and retiming pulse code modulated data streams.

Still another object of the invention is to provide a solid-state digital logic network for regenerating pulse code modulated data streams which have suffered phase and amplitude distortion during transmission over a coaxial cable.

DESCRIPTION OF DRAWINGS

These and other objects and advantages as well as a more thorough understanding of the construction and mode of operation of the invention may be attained from the following description taken in conjunction with the accompanying drawings in which:

FIG. 2 shows the way in which FIGS. 2a and 2b are oriented to form a composite;

FIG. 2a is a portion of a detailed logic diagram of the configuration of FIG. 1 showing the transition detector;

FIG. 2b is a portion of a detailed logic diagram of the configuration of FIG. 1 showing the phase detector, integrated amplifier, voltage controlled oscillator and gating mechanism.

DESCRIPTION OF ILLUSTRATIVE EMBODIMENT

Figure 1:
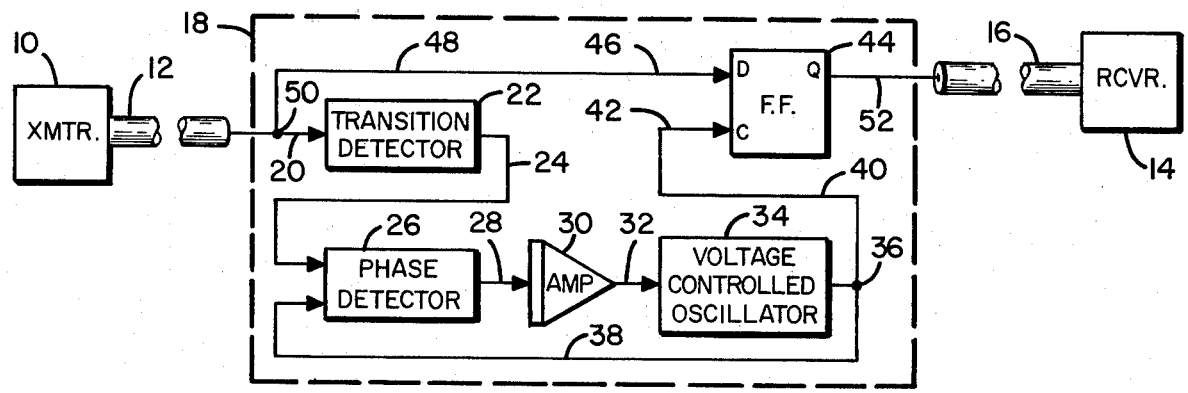
FIG. 1 is a general block diagram of the preferred embodiment of the invention.

Referring to FIG. 1, there is shown a block diagram of the system in which the present invention finds application. As is shown in the figure, there is a transmitter 10 adapted to apply binary coded data streams to a coaxial cable 12. Also illustrated is a data receiver 14 which is adapted to receive the binary coded signals by way of a coaxial cable 16. As was indicated in the introductory portion of this specification, where the length of coaxial cable connecting the transmitter 10 to the receiver 14 exceeds a predetermined length, it may introduce both attenuation and phase distortion to the point where the receiver is unable to distinguish the code pattern being transmitted. To obviate this problem, there is shown enclosed by dashed line box 18 a regenerative repeater, which is the subject matter of the present invention.

Basically, a regenerative repeater receives signals from one transmission line (say transmission line 12), amplifies and re-times the signals and drives a corresponding transmission line such as transmission line 16, in an adjacent cable section. Thus, where the distance between the transmitter 10 and receiver 14 is large, plural regenerative repeaters 18 may be included in the system. However, for the purpose of understanding the invention, it is only necessary to explain in detail the construction and mode of operation of a single repeater, it being understood that any others used in the system would be substantially identical to repeater 18.

The incoming serial signal train of binary coded data, such as NRZ encoded data, is applied by way of a conductor 20 to a device termed a "transition detector" 22. The transition detector serves to produce a discrete pulse (hereinafter referred to as a T pulse) each time that the incoming signal rises above or drops below a predetermined threshold. These T pulses are applied by way of a conductor 24 to a first input of a phase detector network 26. The output from the phase detector appearing on conductor 28 is amplified by means of an integrating amplifier 30 and its resulting output is applied to the control input line 32 of a voltage controlled oscillator (VCO) 34. The VCO 34 is a free-running oscillator whose frequency is controlled (within limits) by the magnitude of the voltage signal appearing on the input line 32 thereto. The resulting clock pulses occurring at the output terminal 36 of the VCO 34 are applied by way of a conductor 38 to a second input terminal of the phase detector 26. Thus, the phase detector 26, the amplifier 30 and the VCO 34 comprise a phase lock loop, the VCO clock being phase locked to the average incoming data rate, but operable to smooth out short term irregularities in pulse position. The transition detector 22 is designed so that either a positive-going or a negative-going transition of the binary coded input data stream generates a T pulse whose position is very nearly independent of the direction of the transition. The phase detector 26 is also designed so that the positive-going and negative-going clock signal transitions from the VCO 34 occur within about 200 picoseconds of each other.

At phase lock, a clock signal transition should split the T pulse in equal halves such that the output from the amplifier 30 is zero and the VCO clock operates at its predesigned frequency. However, if the VCO clock 34 departs in phase from this balanced condition, the phase detector 26 produces a signal on line 28 which is amplified by integrating amplifier 30 to produce a control voltage on the input line 32 to adjust the frequency of the VCO 34 in a direction to produce a zero phase difference. Thus, the frequency of the output from the clock 34 tends to remain synchronized with the transitions of the incoming waveform.

The output from the VCO clock appearing at terminal 36 is also applied by way of conductor 40 to the "Clock" input terminal 42 of an edge triggered flip-flop (D-type flip-flop) 44. Connected to the data input terminal 46 of the flip-flop 44 is a conductor 48 which is tied to the input line 20 at junction 50. Thus, the signal pattern appearing on conductor 48 and applied to the "Data" terminal of the edge triggered flip-flop 44 is the degraded version of the signals being received. As is well known in the art, a D-type flip-flop operates to produce at its Q output terminal 52 the data signal which is appearing at the input data terminal 46 at the time that a predetermined edge (leading or trailing) of a clock signal is applied to the "Clock" input terminal 42. If the D-type flip-flop 44 is designed to operate on a trailing edge, then the output signal appearing on conductor 52 will be high if the input signal at terminal 46 is high at the time that the clock pulse goes from a high level to a low level. Contrawise, the signal appearing at the output terminal 52 will be low if the input signal at terminal 46 is low at the time that the clock signal applied to input terminal 42 drops from a high to a low level.

Figure 2A:
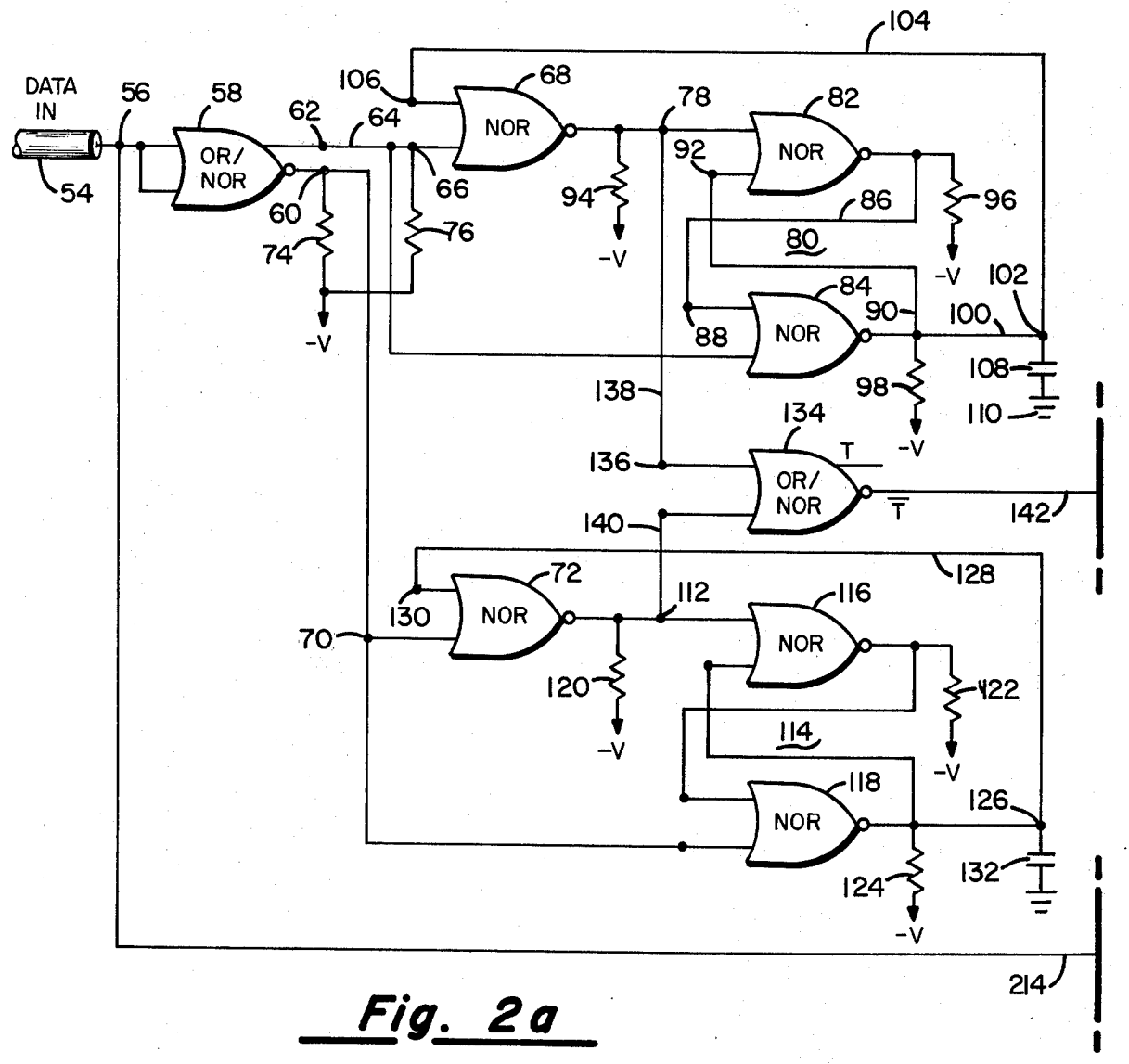

With the general organization and mode of operation of the regenerative repeater of this invention in mind, consideration will next be given to the detailed logic circuit implementation of the network. Referring to FIGS. 2a and 2b, an implementation utilizing emitter coupled logic (ECL) is depicted. First in FIG. 2a, the input binary coded data train which may be from a transmitter device or from an adjacent regenerative repeater is applied by way of a coaxial cable 54 to an input terminal 56 of a NOR circuit 58. Since both input terminals of the NOR circuit 58 are tied together, it acts as an inverter such that the signal appearing at its circled output terminal 60 is the complement of the signal appearing at the input terminal 56. The signal appearing on the output line 62 from the NOR circuit 58 is the direct or true representation of the binary input signal on terminal 56. The true output terminal 62 of the NOR gate 58 is connected by a conductor 64 to a first input terminal 66 of a NOR gate 68. The complement output terminal 60 of the NOR gate 58 is connected to a first input terminal 70 of a NOR gate 72. The terminals 60 and 66 are respectively coupled to a source of negative potential (−V) by resistors 74 and 76.

The output from the NOR gate 68 is applied to the input terminal 78 of a flip-flop network 80 which includes the cross-coupled NOR gates 82 and 84. More specifically, the output from the NOR gate 82 is connected by a conductor 86 to the input terminal 88 of NOR gate 84 while the output from the NOR gate 84 is applied by way of a conductor 90 to the input terminal 92 of NOR gate 82. Again, pull down resistors 94, 96 and 98 respectively connect the output lines from the NOR gate 68, 82 and 84 to a source of negative potential (−V). The output from the flip-flop 80 which appears at the output terminal of the NOR gate 84 is connected by means of a conductor 100 to a junction point 102. A conductor 104 connects the junction point 102 back to the second input terminal 106 of the NOR gate 68. A capacitor 108 is connected between the junction point 102 and a point of fixed potential such as ground 110.

The output from the NOR gate 72 is connected to an input terminal 112 of a second flip-flop indicated generally by the numeral 114. The flip-flop 114 is comprised of a pair of cross-coupled NOR gates 116 and 118. The term "cross-coupling" means that the output of one of the NOR gates 116 or 118 is connected back to an input terminal of the other of said NOR gates while the output from said other NOR gate is connected back to an input terminal of the first mentioned NOR gate. It is well known in the art that when two NOR logic circuits are interconnected in this fashion, they function as a bistable circuit or flip-flop. The output line from the NOR gate 72 is connected by means of a pull down resistor 120 to a source of negative potential, as are the output terminals of the NOR gates 116 and 118 by resistors 122 and 124, respectively. The output from the flip-flop 114 appears at junction 126 and is coupled back by way of a conductor 128 to the second input terminal 130 of the NOR gate 72. A capacitor 132 is connected between the junction 126 and ground.

Still another NOR gate 134 is provided which is connected to receive at a first input terminal 136 the output from the NOR gate 68, by way of a conductor 138. The other input to the NOR gate 134 comes from the output of the NOR gate 72 by way of a conductor 140.

The NOR gates 58, 68, 72, 82, 84, 116, 118 and 134, along with their associated pull down resistors and the capacitors 108 and 132, comprise the transition detector 22 of FIG. 1. The manner in which these circuits operate to produce T pulses at the rising and falling edges of the input signal waveform will be described later on in this specification.

In FIG. 2b, the output from the NOR gate 134 appears on conductor 142 and is applied to the input terminals 144 and 146 of NOR gates 148 and 150. The complement output of the NOR gate 148 is connected through a pull down resistor 151 to a source of negative potential (−V) and through a resistor 152 to a junction point 154. The true output from NOR gate 150 is connected through a pull down resistor 156 to the source of negative potential (−V) and through a resistor 158 to the junction point 154. A parallel combination of a resistor 160 and a capacitor 162 is connected between the junction point 154 and ground. A NOR gate 164 has its true output line connected to the input terminal 166 of the NOR gate 148. The complement output terminal of NOR gate 164 is connected to an input terminal 168 of the NOR gate 150. Pull down resistors 170 and 272 respectively connect the true and complement output from the NOR gate 164 to a suitable source of negative potential (−V).

The NOR gates 148, 150 and 164 along with their associated resistors and capacitors comprise the phase detector 26 of FIG. 1.

The output from the phase detector appearing at junction 154 is connected by conductors 169 and 172 to a first input terminal of an amplifier 174. The output from stage 174 is connected as an input to the inverted input terminal 176 of amplifier stage 178. A conductor 180 connects the other input terminals of amplifiers 174 and 178 together and a resistor 182 is connected direclty between the input terminals of the second stage amplifier 178. Pull down resistor 184 and 186 which are each connected to the source of negative potential (−V) are coupled to the output terminals of the first stage amplifier 174. Similarly, a pull down resistor 188 links the output terminal 190 of stage 178 to the source of negative potential. A capacitor 192 is coupled between the output terminal 190 and ground. A voltage variable capacitor or varactor diode 194 is connected between the junction point 190 and an input terminal 196 of a voltage controlled oscillator 198. A variable capacitor 217 is connected from terminal 196 to ground. The other input terminal for VCO 198 is identified by numeral 200 and is coupled through a capacitor 202 to ground. An inductor 204 is connected directly across the input terminals 196 and 200. The nominal values of the capacitors 217 and 194 and inductor 204 determine the basic frequency of oscillation of the VCO 198.

The output from the VCO 198 appears on conductor 206 and is coupled thereby to the input lines of NOR gate 164 and to the "Clock" (C) input terminal 208 of a D-type, edge-triggered flip-flop 210. The D-input terminal 212 of the flip-flop 210 is coupled by a conductor 214 back to the input terminal 56 such that the degraded input signal train is applied to the D-input terminal of the flip-flop 210. The Q-output terminal of the edge-triggered flip-flop 210 is connected to a source of negative potential (−V) by means of a pull down resistor 216. The signal appearing at the Q-output terminal is also connected to the output coaxial cable which leads to the next regenerative repeater network 14.

OPERATION

Figure 3:
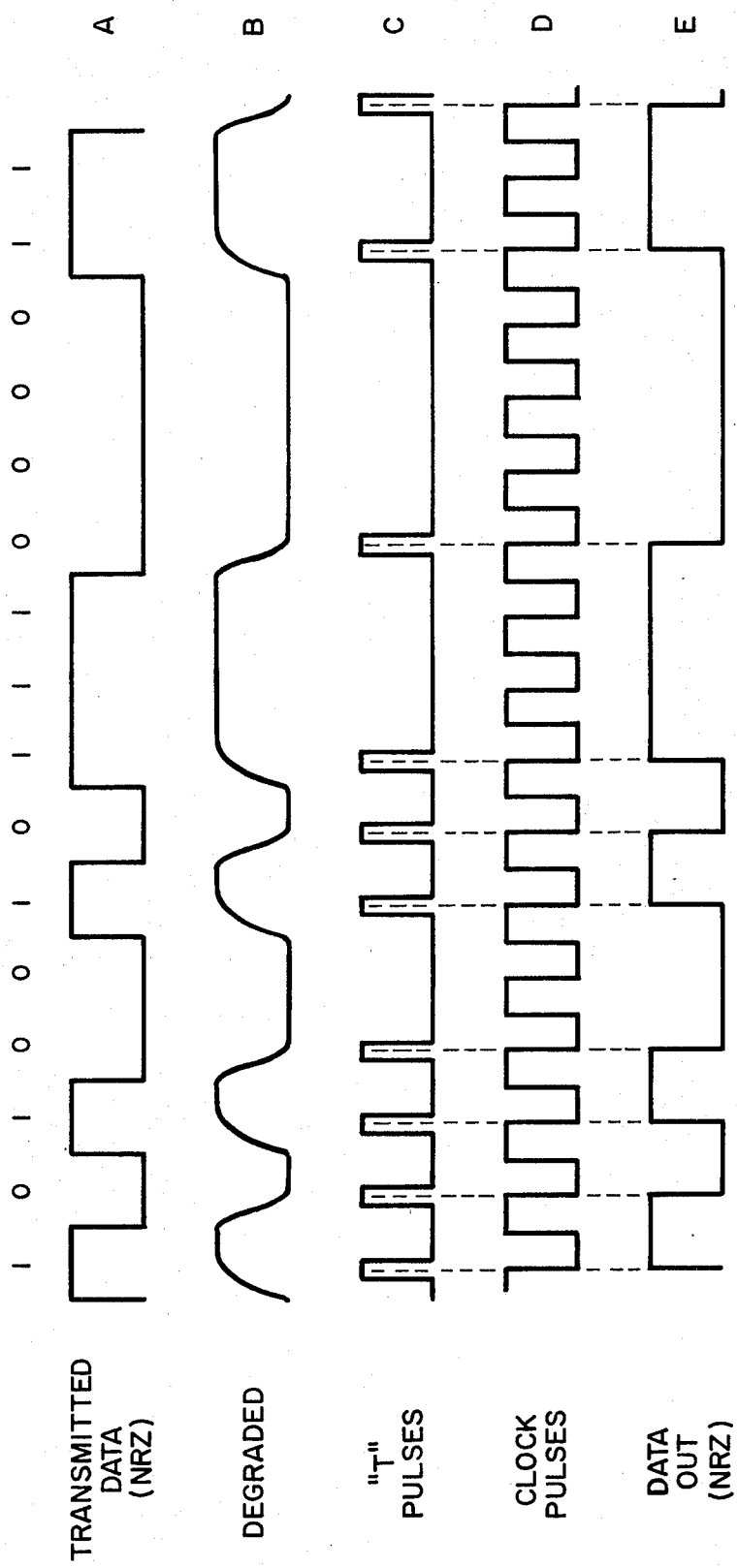
FIG. 3 illustrates waveforms helpful in an understanding of the operation of the preferred embodiment.

Now that the various components and interconnections of the regenerative repeater 18 have been described in detail, consideration will next be given to its mode of operation. In this regard, the waveforms illustrated in FIG. 3 will be used in explaining the operation. Referring to FIG. 3, waveform A represents, by means of a NRZ encoding scheme, the data pattern 1010010111000011. This is the waveform which would appear directly at the output of the transmitter 10 prior to being transmitted over a length of coaxial cable. Waveform B shows the manner in which the waveform of FIG. 3A is degraded by virtue of having passed through a predetermined length of cable. It is the waveform of FIG. 3B which is applied to the input terminal 56 of FIG. 2.

A clearer understanding of operation can be had by considering only the operation of one-half of the transition detector, comprising NOR gates 68, 82 and 84. A positive transition on terminal 66 of gate 84 assures that terminals 102, 92 and 106 are low. Terminal 78 of gate 82 will also go low, so that output terminal 86 of gate 82 will be high. Since terminal 106 went low after terminal 66 went high, no output signal was generated by gate 68. Terminal 88 of gate 84 is left in the high state. A subsequent negative transition thus momentarily leaves unchanged the output of gate 84, and allows the output of gate 68 to go positive. This causes gate 82 output to go negative and gate 84 output to go positive. This causes the output of gate 68 to return to its negative level, completing the output pulse from this half of the transition detector. In review, a positive output pulse is produced at the output of gate 68 on a negative transition on terminals 56 and 66, but no output on a positive transition. Similarly, a positive output pulse is produced at the output of gate 72 on a negative transition on terminals 60 and 70, but no output on a positive transition. Thus a positive pulse is produced on terminal 136 of gate 134 on negative transitions on terminal 56, and a positive pulse is produced on terminal 140 of gate 134 on positive transitions on terminal 56, and negative pulses (T̄ pulses) are produced at gate 134 output for transitions in either direction on terminal 56. The pulses appearing on terminals 78 of gate 82 and 112 of gate 116 have a duration equal to the sum of the gate delays of gates 82, 84 and 68, or gates 116, 118 and 72. The inclusion of the capacitors 108 and 132 serve to increase the duration of the T-pulses. OR/NOR gate 58 performs the functions of a squaring amplifier and phase splitter, maintaining the relative timing for positive and negative transitions. The waveform C of FIG. 3 represents the successive T-pulses generated by the transition detector 22 of FIG. 1. Note that in FIG. 2, the negative, or T̄-pulses are applied to the NOR gates 148 and 150.

The voltage controlled oscillator 198 is free-running square wave oscillator whose nominal frequency is established by the parameter values of the capacitor 217, the varactor diode 194 and the inductor 204 connected to its input terminals. The frequency of oscillation of the VCO is dependent upon the voltage applied to the varactor diode 194 so that the frequency of oscillation can be controlled (within limits) above and below the nominal established value. In practice, the parameter values of capacitor 217 and inductor 204 are set so that the VCO 198 will produce clock signals of a frequency approximately equal to the bit period of the transmitted signal. The output from the VCO 198 appears on conductor 206 and is applied to the NOR gate 164 which, in this instance, acts as an accurate phase splitter. The gate 164 causes the true representation of the clock signal to be applied to the input terminal 166 of NOR gate 148 and the complement of the clock signal to appear at the input terminal 168 of NOR gate 150. The T-pulses are applied by way of conductor 142 to the input terminals 144 and 146, respectively, of NOR gate 148 and 150. When the phase lock condition is prevailing, the trailing edge transition of the clock pulses from the VCO 198 exactly split the T-pulses in equal halves. This is represented by the vertical dashed lines in the waveform diagrams of FIG. 3. The capacitor 162 is therefore charged up and down through the coupling resistors 152 and 158 equally during the period of the T-pulse. As such, no net change results in the voltage appearing across the capacitor 162 when the phase lock condition prevails.

However, if the frequency of the clock 198 should vary from this locked condition, the NOR gates 164, 148 and 150 (the phase detector) operate to develop a net charge on the capacitor 162 and the resulting voltage change is applied by way of conductor 172 and the amplifiers 174 and 178 to produce a change in the voltage applied to the varactor diode 194. This voltage differential is such so as to cause the frequency of the clock 198 to either increase or decrease to thereby reduce the error signal to zero. The phase lock loop including the phase detector 26, the integrating amplifier 30 and the voltage controlled oscillator 34 therefore function to maintain the clock frequency so that on the average the trailing edge transition of the clock pulses exactly divides the transition pulses in half.

The output from the VCO clock 198 is also applied by way of conductor 206 to the Clock input terminal of the D-type flip-flop 210. The Data input terminal 212 of the flip-flop 210 is connected by conductor 214 to receive the degraded input data waveform B of FIG. 3. The output from the flip-flop 210 appearing at the Q-terminal is applied to the next segment of coaxial cable. The waveform shown in FIG. 3E is that appearing at the Q-output terminal of the flip-flop 210 when the waveform of FIG. 3B is applied to its data input terminal. It can be observed that the output data signal will be high if the degraded input data is high at the time that the trailing edge of the clock pulse occurs and that the output signal level will be low if the degraded input data is low at the time that the trailing edge of a clock signal occurs. Because the clock pulses tend to remain locked at the center of the transition pulses (T-pulses) precise retiming and reshaping of the input waveform occurs.

The following table lists various component types and values which are suitable for implementing the preferred embodiment. However, it is to be understood that these component types and values are presented only by way of example and that modifications are possible.

| COMPONENT | TYPE | VALUE |
|---|---|---|
| Transition Detector | Motorola 10102IC | |
| Phase Detector | Motorola 10105IC | |
| Amplifier | Motorola 10116IC | |
| VCO | Motorola 1648IC | |
| D-Type Flip-Flop | Motorola 10131IC | |
| Pull Down Resistors 74, 76, 94, 96, 98, 120, 122, 124, 150, 156, 170, 172, 184, 186, 188, 216 | | 330 ohms |
| $R_{152}, R_{158}$ | | 10K ohms |
| $R_{160}$ | | 82K ohms |
| $R_{182}, R_{183}$ | | 750 ohms |
| $C_{108}, C_{132}$ | | 680 picofarads |
| $C_{162}$ | | 300 to 3000 picofarads |
| $C_{192}$ | | 8200 picofarads |
| $C_{194}$ | 1N4787A Varicap | 8pf Nom. |
| $C_{202}$ | | .01uf |
| $C_{217}$ | | 3 to 25pf Var. |
| Bias Voltage | | −5.2 volts D.C. |

The use of the 10K ohm resistors 152 and 158 and the 680 pf pulse stretching capacitors 108 and 132 resulted in good phase lock. The resistor 160 is included to compensate for the amplifier input (base) current. The capacitor 192 connected between the output of the amplifier and ground serves the purpose of cleaning up the output signal and is sufficiently small so as not to seriously affect the lock-in and drift performance of the regenerative repeater network. The integrating capacitor 162 at the amplifier input controls the drift rate when no transitions are occurring in the input waveform, and also influences the unconditional lock range of the unit. It may also be desirable in certain applications to replace resistors 152 and 158 with a suitable low threshold diode, such as a Schottky diode, to enhance the charging and discharging of the capacitor 162.

Thus it can be seen that there is provided by this invention a regenerative repeater which provides skew correction between a transmitter and a receiver coupled together by a coaxial cable, the repeater being frequency and phase locked to the average input data stream such that irregularities in the input pulse train timing are smoothed out. The device of the present invention is suitable for use in high frequency pulse transmission applications and because it is implemented with integrated circuits, it is physically compact which facilitates packaging and insertion into a length of transmission line.

While there has been shown and described a preferred embodiment, it is to be understood that those skilled in the art may make changes and modifications which are considered to fall within the scope of the invention. Accordingly, such scope is to be determined by the appended claims.

What is claimed is:

1. A repeater network for reshaping and retiming a binary encoded data stream applied thereto, comprising, in combination:
   a. a transition detector circuit connected to receive an input binary encoded data stream for producing a reference pulse each time said input binary coded data stream undergoes a predetermined change in signal level, said reference pulse having a predetermined width;
   b. a voltage controlled oscillator for producing clock pulses having positive and negative transitions;
   c. phase detector means for comparing the phase difference between said reference pulses and said clock pulses by comparing the time relationship of said negative transitions of said clock pulses to the midpoint of said reference pulses and producing an error signal proportional to said phase difference, said error signal being a nullity when said time relationship matches;
   d. means for applying said error signal to said voltage controlled oscillator for modifying the frequency thereof; and
   e. gating means connected to receive said input binary encoded data stream and said clock pulses for producing an output data stream whose binary state corresponds to that of said input binary data stream at the instant that predetermined transitions of said clock pulses occur.

2. A repeater network for reshaping and retiming a binary encoded data stream applied thereto, comprising, in combination:
   a. a transition detector circuit connected to receive an input binary encoded data stream for producing a reference pulse each time said input binary coded data stream undergoes a predetermineed change in signal level, said transition detector circuit comprising,
      first and second NOR gates, each having a pair of input terminals and an output terminal,
      means for applying the true representation of said input binary encoded data stream to a first input terminal of said first NOR gate and the complement representation of said input binary encoded data stream to a first input terminal of said second NOR gate,
      first and second flip-flop circuits each having a pair of input terminals and an output terminal,
      means connecting the output terminal of said first NOR gate to a first terminal of said first flip-flop and the output terminal of said second NOR gate to a first input terminal of said second flip-flop,
      means connecting the output terminal of said first flip-flop to the second input terminal of said first NOR gate and the output terminal of said second flip-flop to the second input terminal of said second NOR gate, and
      a third NOR gate having first and second input terminals and an output terminal, the first input terminal of said third NOR gate being connected to the output terminal of said first NOR gate and the second input terminal of said third NOR gate being connected to the output terminal of said second NOR gate;
   b. a voltage controlled oscillator for producing clock pulses;
   c. phase detector means for comparing the phase difference between said reference pulses and said clock pulses and producing an error signal proportional to said phase difference;
   d. means for applying said error signal to said voltage controlled oscillator for modifying the frequency thereof; and
   e. gating means connected to receive said input binary encoded data stream and said clock pulses for producing an output data stream whose binary state corresponds to that of said input binary data stream at the instant that predetermined transitions of said clock pulses occur.

3. A repeater network for reshaping and retiming a binary encoded data stream applied thereto, comprising, in combination:
   a. a transition detector circuit connected to receive an input binary encoded data stream for producing a reference pulse each time said input binary coded data stream undergoes a predetermined change in signal level;
   b. a voltage controlled oscillator for producing clock pulses;
   c. phase detector means for comparing the phase difference between said reference pulses and said clock pulses and producing an error signal proportional to said phase difference, said phase detector means comprising,
      first and second NOR gates each having first and second input terminals and an output terminal,
      means for applying said reference pulses to said first input terminal of said first and second NOR gates,
      a third NOR gate having an input terminal and first and second output terminals for respectively indicating the true and the complement of the binary signal applied to said input terminal of said third NOR gate,
      means connecting the first output terminal of said third NOR gate to the second input terminal of said first NOR gate and the second output terminal of said third NOR gate to the second input terminal of said second NOR gate,
      means including a capacitor connected to the output terminals of said first and second NOR gates, and
      means connecting the output of said voltage controlled oscillator to said input terminal of said third NOR gate such that said capacitor stores a voltage proportional to the time displacement between said reference pulses and said clock pulses;
   d. means for applying said error signal to said voltage controlled oscillator for modifying the frequency thereof; and
   e. gating means connected to receive said input binary encoded data stream and said clock pulses for producing an output data stream whose binary state corresponds to that of said input binary data stream at the instant that predetermined transitions of said clock pulses occur.

4. Apparatus as in claim 3 wherein said means for applying said error signal to said voltage controlled oscillator comprises:
   a. amplifier means having an input terminal connected to said capacitor and an output terminal coupled to said voltage controlled oscillator.

5. Apparatus as in claim 1 wherein said gating means comprises:

a. a D-type flip-flop having a clock input terminal, a data input terminal and an output terminal;
b. means connecting the output of said voltage controlled oscillator to said clock input terminal; and
c. means connecting said input binary encoded data stream to said data input terminal such that there is produced at said output terminal of said D-type flip-flop, a binary signal level corresponding to the instantaneous binary value of the input binary encoded data stream at the time that a predetermined excursion of said clock signal occurs.

* * * * *